(12) United States Patent
Erickson (10) Patent No.: US 7,854,564 B1
(45) Date of Patent: Dec. 21, 2010

(54) POLE ASSEMBLY

(75) Inventor: Mark T. Erickson, Willmar, MN (US)

(73) Assignee: Uncommon USA, Inc., Willmar, MN (US)

( * ) Notice: Subject to any disclaimer, the term of this patent is extended or adjusted under 35 U.S.C. 154(b) by 0 days.

(21) Appl. No.: 11/728,602

(22) Filed: Mar. 27, 2007

Related U.S. Application Data (60) Provisional application No. 60/789,293, filed on Mar. 31, 2006.

(51) Int. Cl.
*F16B 7/10* (2006.01)

(52) U.S. Cl. .................... 403/379.3; 403/292; 403/362; 248/529; 248/539

(58) Field of Classification Search ............... 403/292, 403/293, 294, 297, 377, 378, 379.3, 362; 248/511, 529, 533, 539; 52/843, 852; D11/181; 285/404, 90, 397
See application file for complete search history.

(56) References Cited

U.S. PATENT DOCUMENTS

| | | | |
|---|---|---|---|
| 51,910 A * | 1/1866 | Barbaroux | ................ 285/404 |
| 859,233 A | 7/1907 | Lane | |
| 1,102,413 A | 7/1914 | Jensen | |
| 1,442,582 A * | 1/1923 | Palmer-Jones | ............. 403/294 |
| 2,850,304 A * | 9/1958 | Wagner | ..................... 285/397 |
| 3,000,656 A * | 9/1961 | Hollaender | ................. 403/298 |
| 3,103,375 A | 9/1963 | McMullin | |
| 3,342,511 A * | 9/1967 | Galloway | ............... 285/149.1 |
| 3,602,531 A * | 8/1971 | Patry | ..................... 285/148.23 |
| 4,068,346 A * | 1/1978 | Binder | ....................... 285/397 |
| 4,344,719 A * | 8/1982 | Thom | ........................ 403/297 |
| 4,671,478 A * | 6/1987 | Schoenig et al. | ........... 403/297 |
| 4,691,818 A * | 9/1987 | Weber | ........................ 403/292 |
| 4,903,354 A * | 2/1990 | Yeh | ............................. 403/292 |
| 4,918,896 A | 4/1990 | Wiese | |
| 4,949,525 A | 8/1990 | Weaver | |
| 5,605,410 A * | 2/1997 | Pantev | ........................ 403/297 |
| 6,273,634 B1 * | 8/2001 | Lohbeck | ..................... 403/297 |
| 7,156,114 B2 * | 1/2007 | Lo | .............................. 403/292 |
| 7,240,928 B2 * | 7/2007 | Evans et al. | ................. 285/333 |

FOREIGN PATENT DOCUMENTS

JP 03-199704 * 8/1991 ................. 403/292

* cited by examiner

*Primary Examiner*—Michael P Ferguson
(74) *Attorney, Agent, or Firm*—Richard John Bartz (57) ABSTRACT

A flagpole having a plurality of linear tubular members with ends of adjacent tubular members connected with coupling members including arcuate segments retained in tight surface engagement with inside surfaces of the tubular members with fasteners.

3 Claims, 7 Drawing Sheets

POLE ASSEMBLY

CROSS REFERENCE TO RELATED APPLICATION

This application claims the priority benefit of U.S. Provisional Application Ser. No. 60/789,293 filed Mar. 31, 2006.

FIELD OF THE INVENTION

The invention is in the art of connecting devices for joining tubular members. The particular connecting device is a tubular connector for connecting adjacent ends of tubular members of an upright pole assembly. The pole assembly can be a flagpole or sailboat mast.

BACKGROUND OF THE INVENTION

Tubular members and pipes are connected with threaded couplings and sleeves to retain the tubular members in end-to-end relationship. An example of a flagpole having a coupling thread on sleeves inserted into adjacent ends of metal pipe sections is disclosed by N. A. Jensen in U.S. Pat. No. 1,102,413. The adjacent ends of the pipe sections are shrunk onto cylindrical studs having threaded outer ends accommodating the coupling. The coupling accommodates different diameter pipe sections. A flagpole having linear tubular members connected with splicing sleeves tightly inserted into adjacent ends of the tubular members and secured to the tubular members with nut and bolt assemblies is disclosed by J. H. Weaver in U.S. Pat. No. 4,949,525. The sleeves and studs are cylindrical tubes that do not compensate for dimensional tolerances of the linear tubular members. Telescoping poles having a plurality of tubular progressively smaller size sections locked together with spring biased pins are disclosed by E. L. McMullin in U.S. Pat. No. 3,103,375. The pins are located in passages within plugs disposed in the lower ends of the tubular sections. The pins do not bias adjacent end sections together and compensate for dimensional tolerances of the tubular sections. A similar telescopic retractable pole having guides to facilitate movement of tubular segments and spring biased locking pins is disclosed by H. Wiess in U.S. Pat. No. 4,918,896.

SUMMARY OF THE INVENTION

The pole assembly of the invention has a plurality of linear tubular members joined in end-to-end relationship to provide an upright pole, such as a flagpole. Coupling members having external annular rings which engage adjacent ends of the tubular members function to secure the tubular members together and stabilize the joined tubular members. The coupling members have opposite segments biased into tight surface engagement with the tubular members with fasteners, such as bolts, that connect opposite ends of tubular members to the coupling members and compensate for dimensional tolerances of the tubular members and coupling members. A modification of the pole assembly has a plurality of linear tubular members having adjacent ends telescoped together. The inside ends of the tubular members having separated arcuate segments that are biased with fasteners into tight surface engagement with the insides of the outer tubular members to connect the tubular members and compensate for dimensional tolerances of the tubular members.

DESCRIPTION OF EMBODIMENTS OF THE INVENTION

Figures 1, 2, 3:
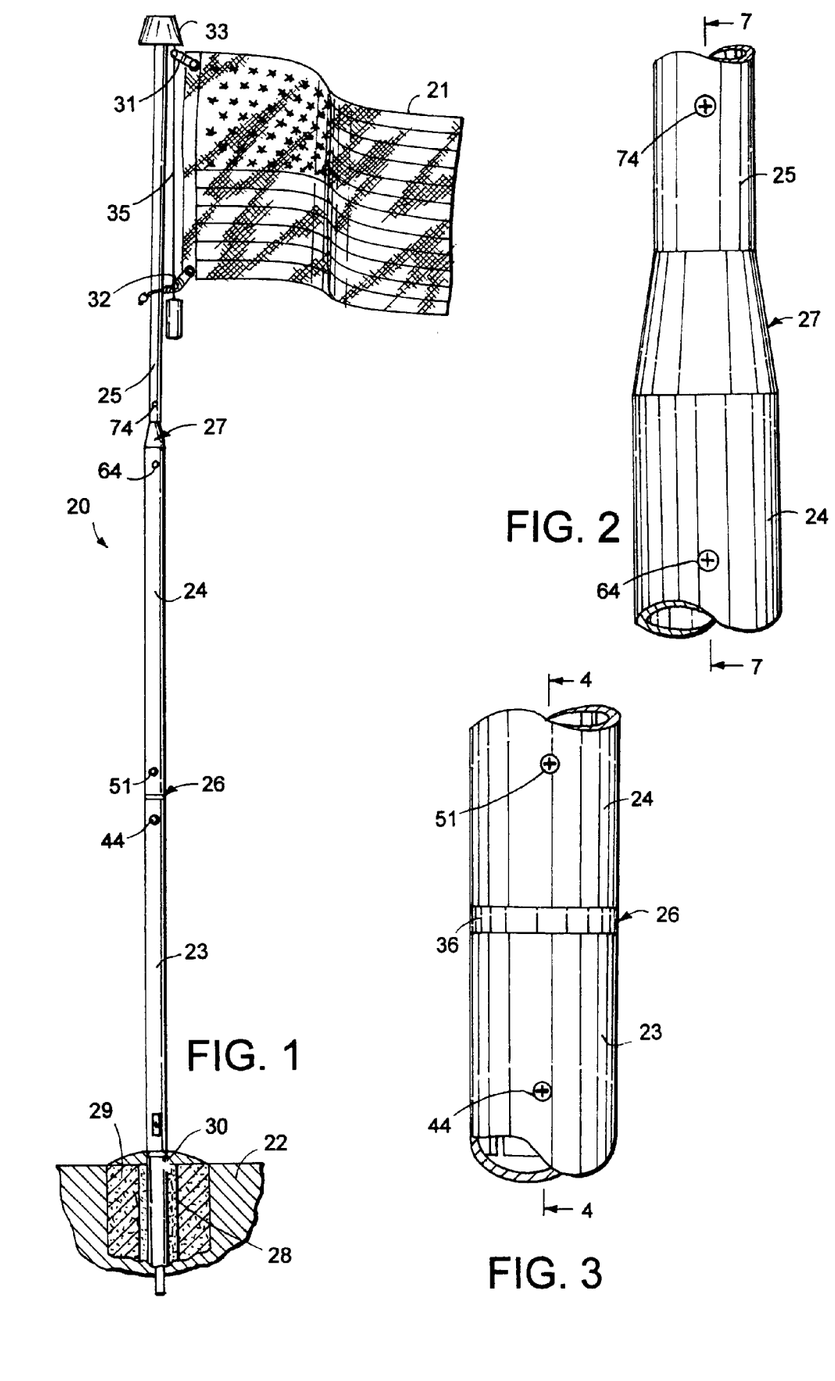
FIG. 1 is an elevational view, partly sectioned, of a flagpole having tubular members connected end-to-end with coupling members.
FIG. 2 is an enlarged elevational view of a portion of the tubular members and a tapered coupling member.
FIG. 3 is an enlarged elevational view of a portion of the tubular members and a straight coupling member.

As shown in FIG. 1, an upright flagpole 20 is connected at its upper end to a flag 21 and anchored at its lower end to ground 22. Flagpole 20 is a pole assembly having a plurality of linear tubular members 23, 24 and 25. Additional tubular members and couplings can be used to increase the height of the flagpole. For example, the flagpole can have three six-foot-long metal four-inch diameter tubular members and two six-foot-long metal three-inch diameter tubular members.

The tubular members 23-25 are cylindrical linear aluminum tubes. Tubes of plastic reinforced with fibers can be fabricated into tubular members 23-25. The tubular members have different diameters with the smaller diameter tubular members located at the upper end of flagpole 20. A first coupling member 26 joins adjacent ends of tubular members 23 and 24. A tapered second coupling member 27 joins adjacent ends of tubular members 24 and 25. Coupling members 26 and 27 are biased into surface contact with adjacent ends of the tubular members 23-25 to compensate for dimensional tolerances of the tubular member 23-25 and coupling members 26 and 27. Coupling members 26 and 27 reinforce the adjacent ends of tubular members 23-25 and maintain the upright strength of the flagpole. The tubular members 23-25 and coupling members 26 and 27 are shipped as separate members and assembled at the location of the flagpole.

The lower end of tubular member 23 fits in a cylindrical sand pocket 28 anchored in a concrete plug 29 in ground 22. A cover 30 located around the base of member 23 encloses the top of plug 29. Other types of anchor devices can be used to retain flagpole 20 in an erected position. Flag 21 is connected to a cable 35 located adjacent to the upper end of tubular member 25 with a swivel snap 31 and connected to cable 35 with swivel snap 32 slidably retained on member 25. A cap 33 or halyard revolving truck closes the upper end of tubular member 25. Cable 25 or halyard extends into cap 33 and within flagpole 20 is connected to swivel snaps 31 and 32 and is used to raise lower flag 21. An example of a cable within a flagpole operable to raise and lower a flag is disclosed by L. H. Platt, Jr. in U.S. Pat. No. 3,417,732. Other devices including external cables can be used to retain flag 21 on flagpole 20 and raise and lower the flag.

Figure 4:
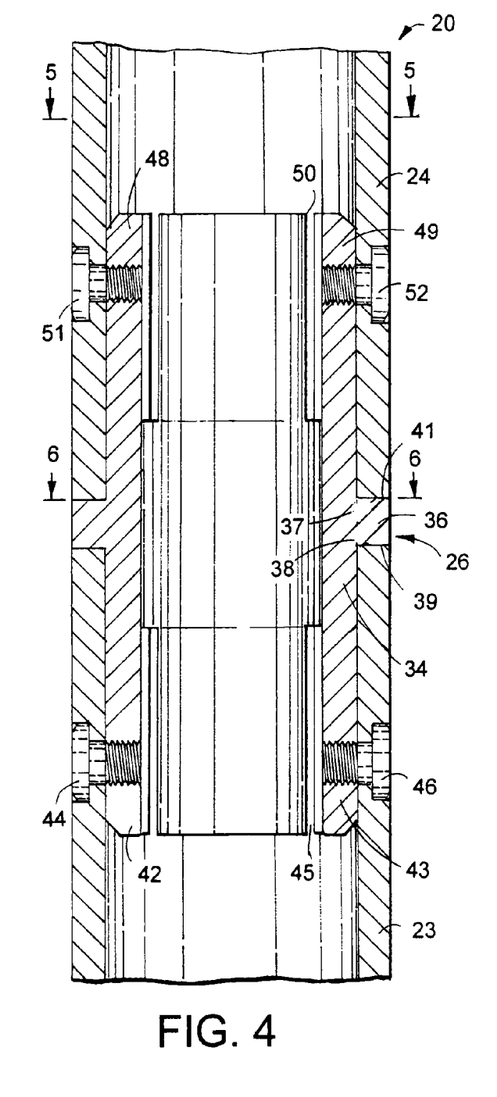
FIG. 4 is an enlarged sectional view taken along the line 4-4 of FIG. 3.
Figure 5:
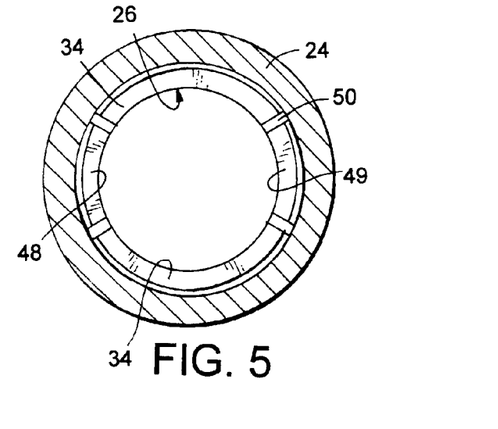
FIG. 5 is a sectional view taken along the line 5-5 of FIG. 4.
Figure 6:
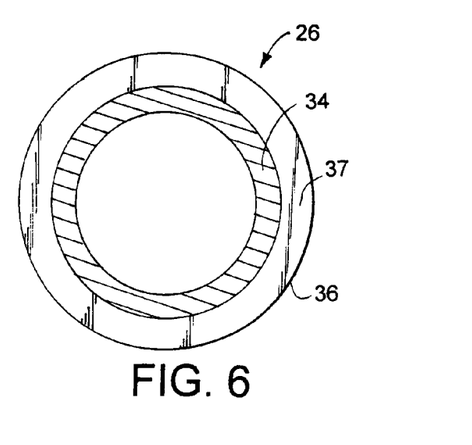
FIG. 6 is a sectional view taken along the line 6-6 of FIG. 4.

As shown in FIGS. 4, 5 and 6, tubular members 23 and 24 are linearly aligned and secured together with coupling member 26. Coupling member 26 comprises a cylindrical sleeve 34 having an outwardly extended annular body or circumferential rib 36. Rib 36 has flat circular upper and lower surfaces 37 and 38 located in surface engagement with the adjacent flat circular ends 39 and 41 of tubular members 23 and 24. Rib 36 functions to limit angular and cocking movements of tubular members 23 and 24. The lower section of coupling member 26 has separated opposite arcuate segments 42 and 43 held in tight surface engagement with fasteners 44 and 46. Linear slots 45 define the width of each of the segments 42 and 43. Fasteners 44 and 46 are shown as bolts threaded into holes in segments 42 and 43. The bolts have heads located in recessed holes in tubular member 23 and threaded bodies located in the threaded holes in segments 42 and 43. Other types of fasteners can be used to secure segments 42 and 43 to tubular member 23. Fasteners 44 and 46 are turned to clamp segments 42 and 43 in tight surface engagement with the inside surface of tubular member 23 thereby compensating for dimensional tolerances of tubular member 23 and coupling member 26. The lower end of coupling member 26 can have additional segments or one segment accommodating fasteners to clamp the segments or segment against the inside wall of tubular member 23. The upper section of coupling member 26 has opposite arcuate segments 48 and 49 located in tight surface engagement with the inside surface of tubular coupling 24. Linear slots 50 define the width of each of the segments 48 and 49. Fasteners 51 and 52 are shown as bolts threaded into holes in segments 48 and 49. The bolts have heads located in stepped holes in coupling member 24 and bodies threaded into the holes in segments 48 and 49. The upper end of coupling member 26 can have additional segments or one segment accommodating fasteners for clamping the segments or segment into tight surface engagement with the inside surface of tubular member 24. The opposite ends of coupling member 26 has chambered outer edges 53 and 54 to facilitate insertion into the adjacent ends of tubular members 23 and 24.

Figures 7, 8, 9:
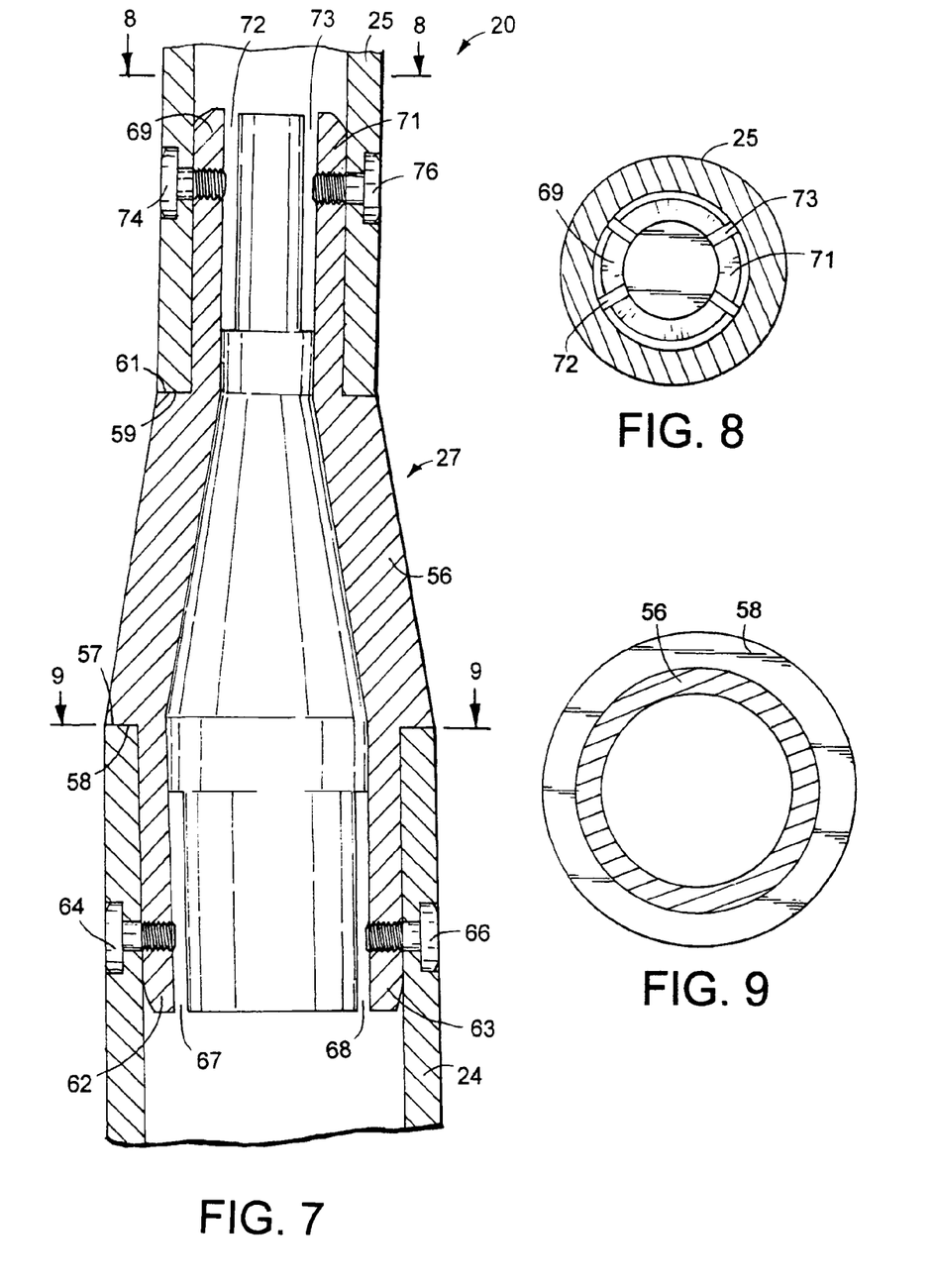
FIG. 7 is an enlarged sectional view taken along the line 7-7 of FIG. 2.
FIG. 8 is a sectional view taken along the line 8-8 of FIG. 7.
FIG. 9 is a sectional view taken along the line 9-9 of FIG. 7.

Tapered coupling member 27, shown in FIGS. 7, 8 and 9, connects large diameter tubular member 24 to small diameter tubular member 25. Coupling member 27 has a cone-shaped body 56 having a large end with a circular shoulder 57 located in surface engagement with the flat circular end 58 of tubular member 24 and a small end with a circular shoulder 59 located in surface engagement with the flat circular end 61 of tubular member 25. The lower section of coupling member 27 has separated opposite arcuate segments 62 and 63 retained in tight surface engagement with the inside surface of tubular member 24 with fasteners 64 and 66. Linear slots 67 and 68 define the width of each of the segments 62 and 63. The fasteners 64 and 66 are bolts threaded into holes in segments 62 and 63 to clamp segments into tight surface engagement with the inside surface of tubular member 24 thereby compensating for dimensional tolerances of tubular member 24 and the lower end of coupling member 27. The upper section of coupler member 56 has separate opposite arcuate segments 69 and 71. The width of each of the segments 69 and 71 is defined by pairs of linear slots 72 and 73 shown in FIG. 8. Fasteners 74 and 76, shown as bolts, clamp segments 69 and 71 in tight surface engagement with the inside surface of tubular member 25 to compensate for dimensional tolerances of the upper end of coupling member 27 and tubular member 25 and secure tubular member 25 to coupling member 27. Fasteners 74 and 76 are threaded into holes in arcuate segments 69 and 71. Fasteners 64, 66, 74 and 76 can be removed from coupler member 27 and tubular members 24 and 25 to allow separation of tubular members 24 and 25 from coupler member 27. As shown in FIG. 7, coupling 27 has an internal passage having a tapered middle section. The passage within coupling 27 can have a uniform internal diameter. Additional segments or a single segment can be used at opposite ends of the coupling member to accommodate fasteners to attach the coupling member to tubular members 24 and 25. The lengths of tubular members 23, 24 and 25 and coupling members 26 and 27 allow flagpole 20 to be shipped as separate members and assembled at its display location.

Figure 10:
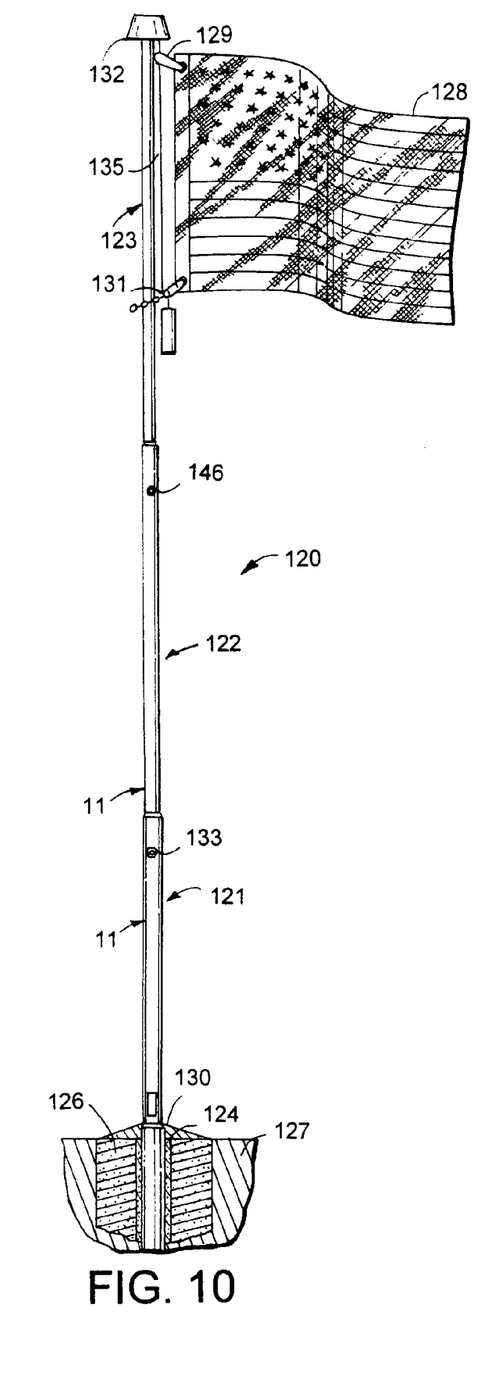
FIG. 10 is a front elevational view, partly sectional, of a first modification of the flagpole of FIG. 1 having a plurality of linear tubular members connected together with fasteners.
Figure 11:
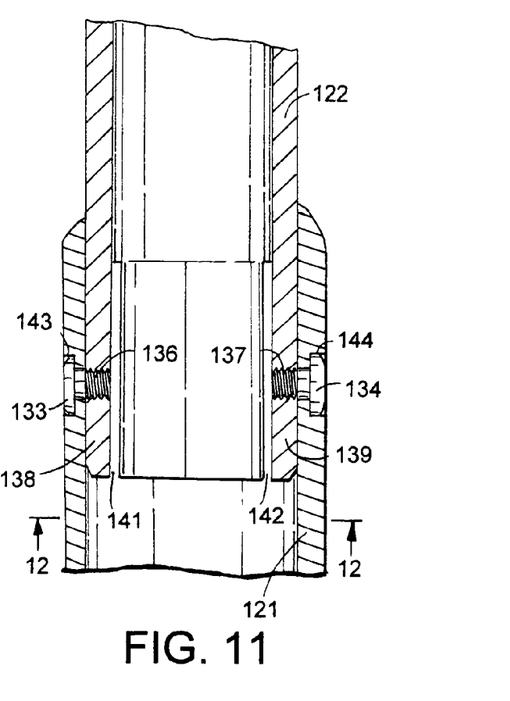
FIG. 11 is an enlarged sectional view taken along the line 11-11 of FIG. 10.
Figure 12:
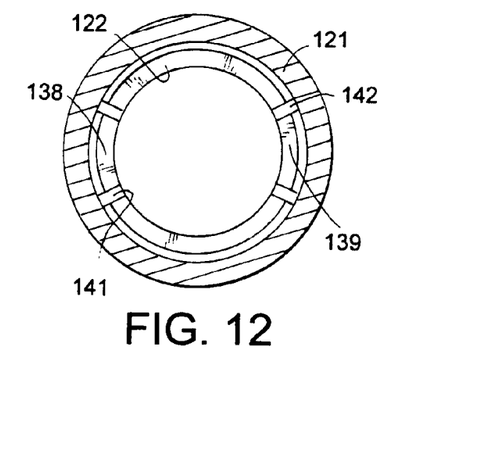
FIG. 12 is a sectional view taken along the line 12-12 of FIG. 11.

A first modification of the flagpole of FIG. 1, shown in FIGS. 10 to 12, has an upright pole assembly 120 comprising a plurality of linear tubular members 121, 122 and 123 joined together in end-to-end relationship. Tubular members 121, 122 and 123 are linear aluminum tubes or pipes. The lower end of tubular member 121 is inserted into a sand pocket 124 anchored to a concrete plug 126 in ground 127. A cover 130 is located on top of plug 126. A flag 128 is attached to swivel snaps 129 and 131 located adjacent the upper tubular member 123. A cap 132 mounted on top of tubular member 123 closes the open top end of tubular member 123. A cable 135 or cord within pole 120 connected to swivel snap 129 is used to raise and lower flag 128. An example of a cable within a flagpole used to raise and lower a flag is disclosed by L. H. Platt, Jr. in U.S. Pat. No. 3,417,732. External cables can be used to retain flag 128 on pole 123 and raise and lower the flag.

As shown in FIGS. 11 and 12, the lower end of tubular member 122 is inserted into the upper end of tubular member 121 and retained with fasteners 133 and 134. Fasteners 133 and 134 shown as bolts threaded into holes 136 and 137 in arcuate segments 138 and 139 clamp segments 138 and 139 into tight surface engagement with opposite portions of the inside wall of the upper end of tubular member 121. Pairs of linear slots 141 and 142 define the width of each of segments 138 and 139. Fasteners 133 and 134 have heads located in recessed holes 143 and 144 in tubular member 121. In use, fasteners 133 and 134 threaded into holes 136 and 137 bias and flex segments 138 and 139 into tight surface engagement with the inside wall of tubular member 122 thereby preventing lateral and swinging movements of tubular member 122 relative to tubular member 121. Tubular members 122 and 123 are connected with fasteners 146 according to the structure shown in FIGS. 11 and 12.

A second modification of the flagpole of FIG. 1, shown in FIGS. 13 to 22, has an upright pole assembly 200 comprising a plurality of linear tubular members 223, 224 and 225 joined together in end-to-end relationship with coupling members 226 and 227. Tubular members 223-225 are linear aluminum tubes joined together with metal couplings 226 and 227. Tubular member 225 has an outside diameter that is smaller than the outside diameter of tubular member 224. For example, tubular member 225 can be an aluminum three-inch diameter tube and tubular member 224 can be an aluminum four-inch diameter tube. Additional tubular members and couplings can be used to increase the height of the flagpole.

Figures 13, 14, 15:
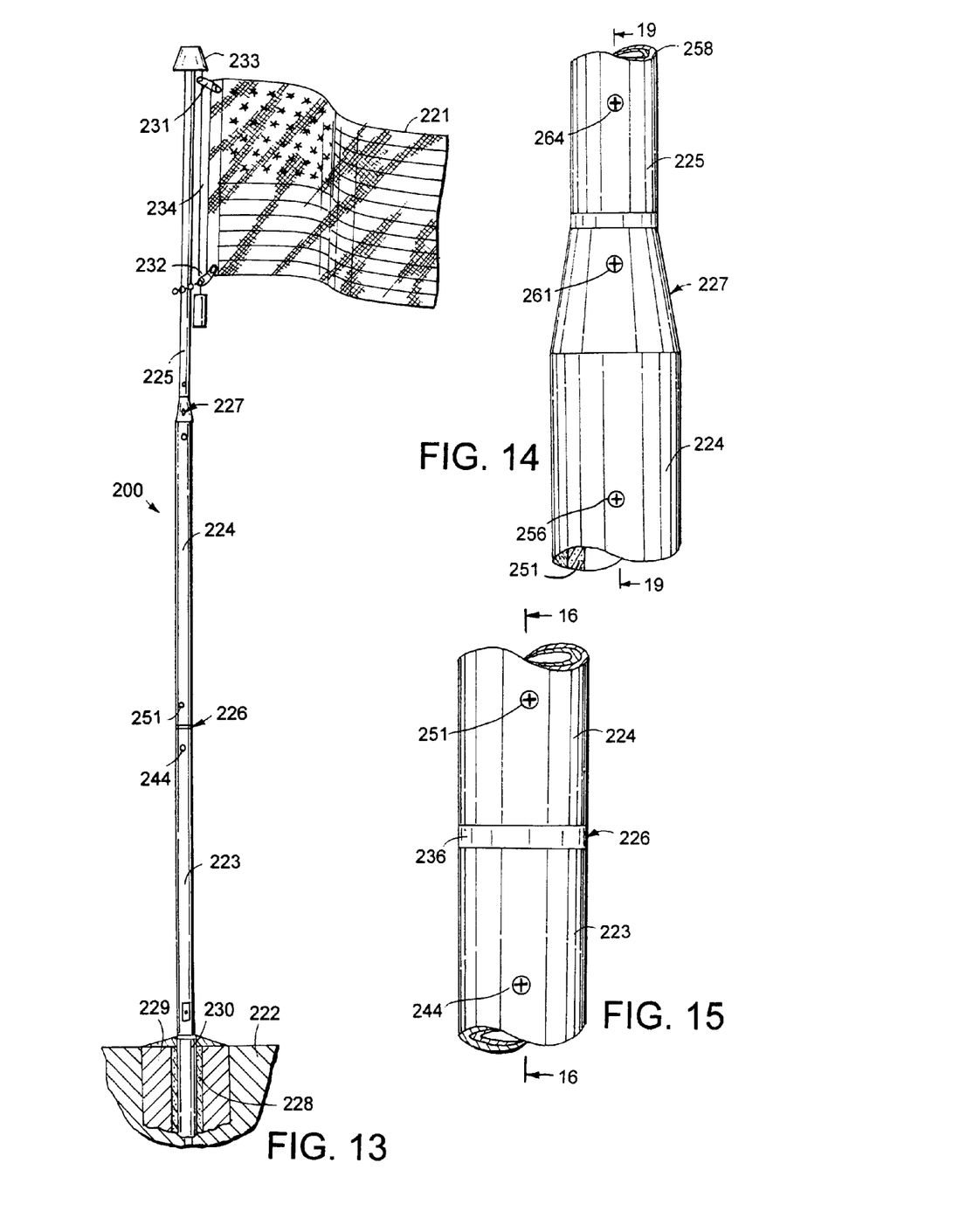
FIG. 13 is a front elevational view, partly sectioned, of a second modification of the flagpole of FIG. 1 having a plurality of linear tubular members connected with coupling members.
FIG. 14 is an enlarged elevational view of a portion of adjacent tubular members connected with a straight coupling member.
FIG. 15 is an enlarged elevational view of a portion of adjacent tubular members connected with a tapered coupling member.

The lower end of tubular member 223 is anchored in an upright sand pocket 228 in a concrete plug 229. Plug 229 extends downwardly into ground 222. A cone-shaped cover 230 surrounds tubular member 223 to enclose the top of pocket 228 and plug 229. Other types of anchor devices can be used to retain flagpole 200 in an erected position.

Flag 221 located adjacent the upper end of tubular member 225 is attached with a swivel snap 231 to a halyard or steel cable 234. The lower end of cable 234 extends downwardly to a second swivel snap 232. Swivel snaps 231 and 232 extend through eyelets in opposite ends of the header of the flag. A beaded retainer ring located around tubular member 225 and connected to swivel snap 232 allows the flag 221 to be lowered. A neoprene coated counterweight connected to swivel snap 232 biases cable 234 in a downward direction to facilitate lowering of the flag. The upper end of cable 234 is trained over a pulley within cap 223 or concealed halyard revolving truck. Cable 234 extends downwardly within tubular members 223-235 to a winch located within the bottom of tubular member 223. A removable crank handle is used to wind and unwind cable 234 onto and off the winch to selectively raise and lower flag 221. An example of a cable within a flagpole operable to raise and lower a flag is disclosed by L. H. Platt Jr. in U.S. Pat. No. 3,417,732.

Figure 16:
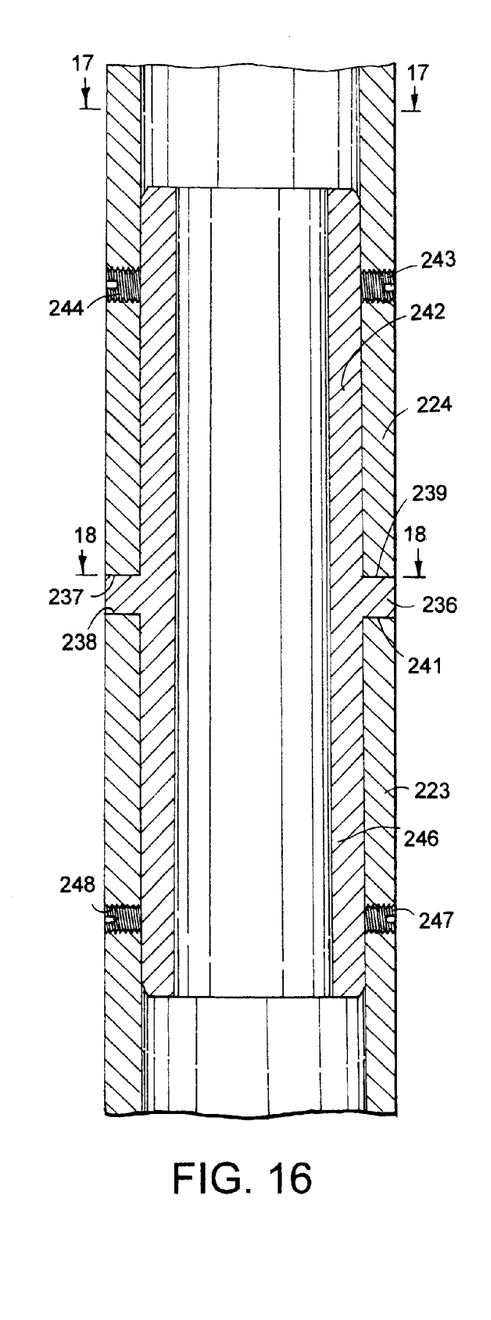
FIG. 16 is an enlarged sectional view taken along the line 16-16 of FIG. 15.
Figure 17:
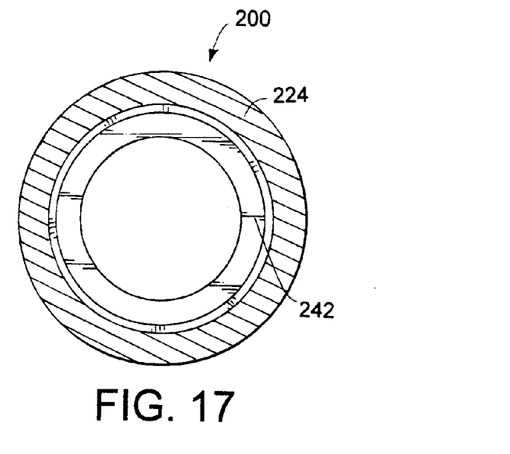
FIG. 17 is a sectional view taken along the line 17-17 of FIG. 16.
Figure 18:
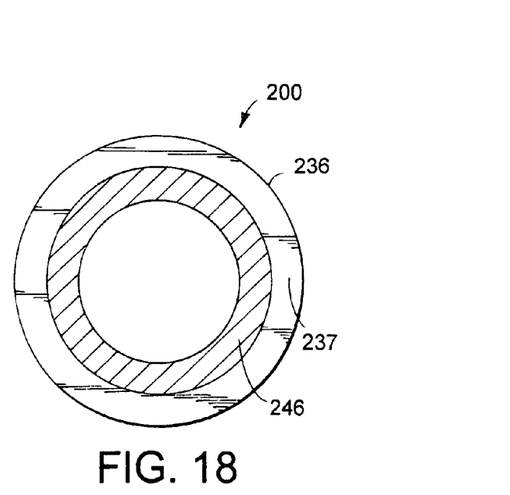
FIG. 18 is a sectional view taken along the line 18-18 of FIG. 16.

As shown in FIGS. 15 and 16, coupling 226 is connected to adjacent ends of tubular members 223 and 224 to retain tubular members 223 and 224 in axial end-to-end alignment. An annular rib 236 having flat circular upper and lower surfaces 237 and 238 located in flat surface engagement with the flat circular ends 239 and 241 of tubular members 223 and 224 limit angular and cocking movements of tubular members 223 and 224. Coupling 226 has a cylindrical sleeve with upper and lower sections 242 and 246 located in firm surface engagement with the inside cylindrical walls of tubular members 223 and 224. Fasteners comprising a first pair of set screws 243 and 244 threaded into holes in tubular member 224 bear against opposite sides of upper section 242 of the sleeve. A second pair of set screws 247 and 248 threaded into holes in tubular member 223 bear against opposite sides of the lower section 246 of the sleeve. Set screws 243, 244, 247 and 248 are releasable fasteners that prevent axial separation of tubular members 223 and 224 from coupling 226, rotation of tubular members 223 and 224 on coupling 226 and maintain the ends 239 and 241 in tight engagement on rib 236 and allow erection of the flagpole at its use location.

Figure 19:
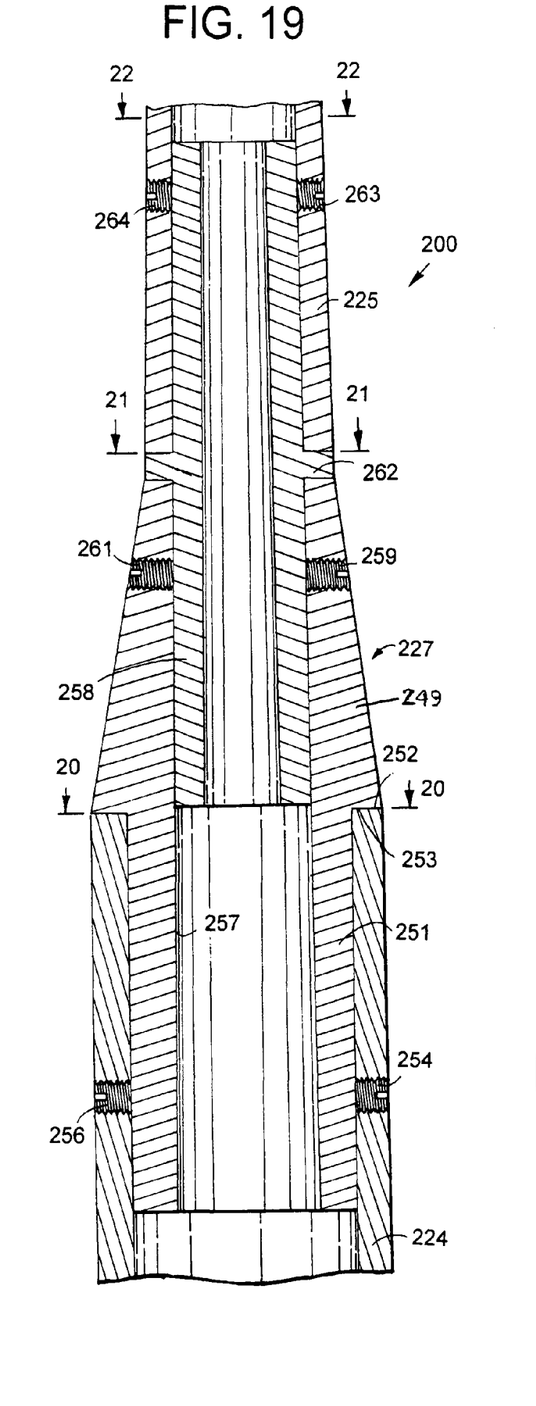
FIG. 19 is an enlarged sectional view taken along the line 19-19 of FIG. 14.
Figure 20:
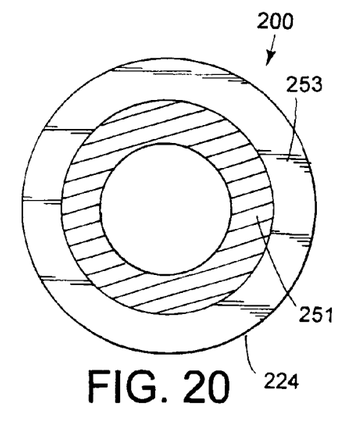
FIG. 20 is a sectional view taken along the line 20-20 of FIG. 19.
Figure 21:
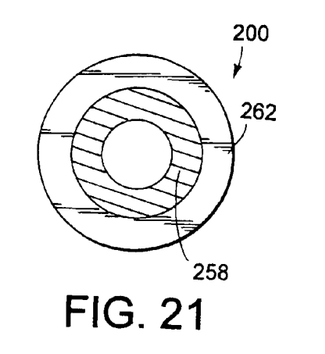
FIG. 21 is a sectional view taken along the line 21-21 of FIG. 19.
Figure 22:
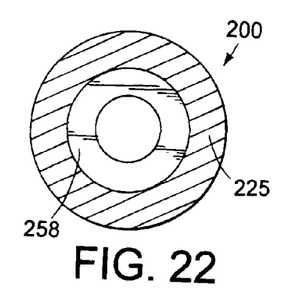
FIG. 22 is a sectional view taken along the line 22-22 of FIG. 19.

Tapered coupling member 227, shown in FIGS. 13 and 19 to 22, connects in end-to-end relation large diameter tubular member 224 to smaller diameter tubular member 225. Coupling member 227 has a cone shaped body 249 joined to a downward extended cylindrical member 251. Body 249 and member 251 has a common cylindrical inside wall 257. Member 251 is telescoped into the upper end of tubular member 224 with cylindrical member 251 in surface engagement with the inside cylindrical wall of tubular member 224. Body 249 has a large diameter end having a circular flat shoulder 252 located in surface engagement with the flat circular end 253 of tubular member 224. Fasteners, shown as set screws 254 and 256 threaded through holes in opposite sides of tubular member, engage member 251 and retain shoulder 252 against circular end 253 of tubular member 224 and prevent axial and rotational movements of coupling 227 relative to tubular member 224. A cylindrical sleeve 258 has a lower section telescoped into body 249. Sleeve 258 has an outer cylindrical wall located in firm surface engagement with the inside cylindrical wall 257 of body 249. Fasteners, shown as set screws 259 and 251 threaded through holes in body, contact opposite sides of sleeve 250 and retain a rib 262 joined to sleeve 248 in tight surface engagement with the flat upper or small end of body 249 and prevent axial and rotational movements of sleeve 258 relative to body 259. As shown in FIGS. 19 and 22, the lower end of tubular member 225 is telescoped over the upper end of sleeve 258. The outside cylindrical wall of sleeve 258 is located in firm surface engagement with the cylindrical inside wall of tubular member 225. The lower end of tubular member 225 is located in surface engagement with rib 262. Fasteners, shown as set screws 263 and 264 threaded through holes in tubular member 225, contact opposite sides of sleeve 258 and retain tubular member 225 in firm engagement with rib 262 and prevent axial and rotational movements of tubular member 225 relative to sleeve 258. The lengths of tubular members 223-225, coupling members 226 and 227, and the fasteners allow all the parts of the flagpole to be shipped to the flagpole erection site by conventional transport services. The flagpole is assembled in a horizontal position and raised to an upright position as a unit and set into plug 229 which maintains the flagpole in its upright position.

The pole assembly disclosed herein is a simple and novel construction having separate members that can be transported to an erection site and quickly and easily assembled in a minimum of time and labor. The erected pole assembly is strong and has a long service life. Changes in structures and arrangement of structures and materials can be made by persons skilled in the art without departing from the scope of the invention.

The invention claimed is:

1. A pole assembly comprising:
first, second and third linear tubular members having outside cylindrical walls and ends, said ends having inside cylindrical walls having first continuous diameters and annular radial ends, said third tubular member having an outside diameter smaller than the outside diameter of the second tubular member;
a first coupling member connected to adjacent ends of the adjacent first and second tubular members to secure the first and second tubular members together in end-to-end relationship, said first coupling member having an annular body comprising a continuous annular outwardly directed rib surrounding the middle of the coupling members, said rib having annular radial side walls in surface contact with adjacent annular radial ends of the first and second tubular members and an outer cylindrical surface coextensive with the outside cylindrical walls of the first and second tubular members, said annular body including a plurality of linear arcuate first segments extending from each annular radial side wall and having outer surfaces located in surface contact with the inside cylindrical walls of the first and second tubular members, first linear slots circumferentially separating adjacent first segments of the first coupling member whereby the outer surface of each of the first segments is located in surface contact with an inside wall of one of the inside walls of the first and second tubular members;

first fasteners mounted on the first and second tubular members and engageable with the segments to retain the outer surfaces of the segments in tight surface engagement with the inside cylindrical walls of the first and second tubular members, said adjacent ends of the first and second tubular members each including a plurality of circumferentially spaced recessed holes having outside diameters and inside diameters smaller than the outside diameters and annular radial shoulders between the outside and inside diameters, said arcuate segments of the first coupling member each having a radial threaded hole aligned with a respective one of the recessed holes, said first fasteners comprising bolts having heads engageable with said annular radial shoulders and threaded bodies located in the radial threaded holes of the arcuate segments of the first coupling member whereby each bolt threadably engages the radial threaded hole of a respective one of the segments such that the outer surface of the respective segment is clamped radially outward in tight surface engagement with the inside cylindrical wall of one of the first and second tubular members;

a second coupling member connected to adjacent ends of the second and third tubular members to secure the second and third tubular members together in end-to-end relationship, said second coupling member having a body with a cone-shaped outer surface with a large end and a small end, said large and small ends having annular surfaces in surface contact with the adjacent annular radial ends of the second and third tubular members and a plurality of linear arcuate second segments extending from the annular surface of each of the large and small ends and having outer surfaces located in surface contact with the inside cylindrical walls of the second and third tubular members, second linear slots circumferentially separating adjacent second segments of the second coupling member whereby the outer surface of each of the second segments is located in surface contact with an inside wall of one of the inside walls of the second and third tubular members; and second fasteners mounted on the second and third tubular members to retain the arcuate segments of the second coupling members in tight surface engagement with the cylindrical walls of the second and third tubular members, said adjacent ends of the second and third tubular members each including a plurality of circumferentially spaced recessed holes having outside diameters and inside diameters smaller than the outside diameters and annular shoulders between the outside and inside diameters, said segments of the second coupling member each having a radial threaded hole aligned with a respective one of the recessed holes of the second and third tubular members, said second fasteners comprising bolts having heads engageable with said annular shoulders and threaded bodies located in the radial threaded holes of the segments of the second coupling member whereby each second fastener threadably engages the radial threaded hole of a respective one of the segments of the second coupling member such that the outer surface of the respective segment of the second coupling member is clamped radially outward in tight surface engagement with the inside cylindrical wall of one of the second and third tubular members.

2. A pole assembly comprising:

first, second and third linear tubular members, said third tubular member having an outside diameter smaller than the outside diameter of the second tubular member, said first tubular member having an end portion with an inside cylindrical wall and an annular radial end, said second tubular member having opposite first and second end portions with inside cylindrical walls and annular radial ends, said third tubular member having an end portion with an inside cylindrical wall and an annular radial end;

a first coupling member connected to adjacent end portions of the first and second tubular members to secure the first and second tubular member together in end-to-end relationship, said first coupling member having an annular outwardly directed rib with annular radial side walls in surface engagement with the adjacent radial ends of the first and second tubular members and an outer cylindrical surface coextensive with the outside cylindrical walls of the first and second tubular members, said first coupling member having a plurality of linear arcuate first segments extending from each annular radial side wall and having outer surfaces located in surface contact with the inside cylindrical walls of adjacent end portions of the first and second tubular members, first linear slots circumferentially separating adjacent first segments of the first coupling member whereby the outer surface of each of the first segments is located in surface contact with an inside wall of one of the inside walls of the first and second tubular members;

first fasteners mounted on the first and second tubular members engageable with the first segments of the first coupling member to secure the first coupling member to the first and second tubular members and hold the rib in engagement with the adjacent radial ends of the first and second tubular members, said adjacent ends of the first and second tubular members each including a plurality of circumferentially spaced recessed holes, said arcuate segments of the first coupling member each having a radial threaded hole aligned with a respective one of the recessed holes, said first fasteners comprising bolts having heads engageable with said recessed holes and threaded bodies located in the radial threaded holes of the arcuate segments of the first coupling member whereby each bolt threadably engages the radial threaded hole of a respective one of the segments such that the outer surface of the respective segment is clamped radially outward in tight surface engagement with the inside cylindrical wall of one of the first and second tubular members;

a second coupling member connected to adjacent end portions of the second and third tubular members to secure the second and third tubular members together in end-to-end relationship, said second coupling member having a body with a cone-shaped outer surface with a large end and a small end, said large and small ends having annular radial surfaces in surface contact with the adjacent radial ends of the second and third tubular members and a plurality of linear arcuate second segments extending from the annular radial surface of each of the large and small ends and having outer surfaces located in surface contact with the inside cylindrical walls of adjacent portions of the second and third tubular members, second linear slots circumferentially separating adjacent second segments of the second coupling member whereby the outer surface of each of the second segments is located in surface contact with an inside wall of one of the second and third tubular members; and second fasteners mounted on the second and third tubular members engageable with the second segments of the second coupling member to secure the second coupling member to the second and third tubular members and hold the body in surface contact with the adjacent radial ends of the second and third tubular members, said adjacent ends of the second and third tubular members each including a plurality of circumferentially spaced recessed holes, said segments of the second coupling member each having a radial threaded hole aligned with a respective one of the recessed holes of the second and third tubular members, said second fasteners comprising bolts having heads engageable with said recessed holes and threaded bodies located in the radial threaded holes of the segments of the second coupling member whereby each second fastener threadably engages the radial threaded hole of a respective one of the segments of the second coupling member such that the outer surface of the respective segment of the second coupling member is clamped radially outward in tight surface engagement with the inside cylindrical wall of one of the second and third tubular members.

3. A pole assembly comprising:

first, second and third linear tubular members having end portions with inside cylindrical walls;

a first coupling member inserted into adjacent end portions of the first and second tubular members to secure the first and second tubular members in end-to-end relationship, said first coupling member including an annular body having radial end walls engageable with adjacent end portions of the first and second tubular members and a plurality of linear arcuate first segments extending from each radial end wall and having outer surfaces engageable with the inside cylindrical walls of the first and second tubular members, said segments being telescoped into the adjacent end portions of the first and second tubular members, first slots circumferentially separating adjacent first segments of the first coupling member whereby the outer surface of each of the first segments is located in surface contact with an inside wall of one of the first and second tubular members;

first fasteners for holding the outer surfaces of the first segments of the first coupling member in tight surface contact with the adjacent inside cylindrical walls of the end portions of the first and second tubular members, said adjacent ends of the first and second tubular members each including a plurality of circumferentially spaced recessed holes, said arcuate segments of the first coupling member each having a radial threaded hole aligned with a respective one of the recessed holes, said first fasteners comprising bolts having heads engageable with said recessed holes and threaded bodies located in the radial threaded holes of the arcuate segments of the first coupling member whereby each bolt threadably engages the radial threaded hole of a respective one of the segments such that the outer surface of the respective segment is clamped radially outward in tight surface engagement with the inside cylindrical wall of one of the first and second tubular members;

a second coupling member inserted into adjacent end portions of the second and third tubular members to secure the first and second tubular members in end-to-end relationship, said second coupling member having an annular body with ends having radial end walls engageable with adjacent end portions of the second and third tubular members and a plurality of linear arcuate second segments extending from each radial end wall of the second coupling member and telescoped into the adjacent end portions of the second and third tubular members, said second segments having outer surfaces, second slots circumferentially separating adjacent second segments of the second coupling member whereby the outer surface of each second segment is located in surface contact with an inside wall of one of the second and third tubular members; and second fasteners mounted on the second and third tubular members engageable with the cylindrical members of the second coupling member to secure the second coupling member to the second and third tubular members and hold the body of the second coupling member in contact with the adjacent radial ends of the second and third tubular members, said adjacent ends of the second and third tubular members each including a plurality of circumferentially spaced recessed holes, said segments of the second coupling member each having a radial threaded hole aligned with a respective one of the recessed holes of the second and third tubular members, said second fasteners comprising bolts having heads engageable with said recessed holes and threaded bodies located in the radial threaded holes of the segments of the second coupling member whereby each second fastener threadably engages the radial threaded hole of a respective one of the segments of the second coupling member such that the outer surface of the respective segment of the second coupling member is clamped radially outward in tight surface engagement with the inside cylindrical wall of one of the second and third tubular members.

* * * * *